United States Patent
Kim et al.

(10) Patent No.: US 9,810,813 B2
(45) Date of Patent: Nov. 7, 2017

(54) DISPLAY DEVICE AND OPTICAL FILM INCLUDED THEREIN

(71) Applicant: Samsung Display Co. Ltd., Yongin (KR)

(72) Inventors: Joong Hyun Kim, Asan-si (KR); Min Su Kim, Hwaseong-si (KR); Ju Youn Son, Hwaseong-si (KR); Seung Hwan Chung, Asan-si (KR)

(73) Assignee: SAMSUNG DISPLAY CO. LTD, Gyeonggi-Do (KR)

( * ) Notice: Subject to any disclaimer, the term of this patent is extended or adjusted under 35 U.S.C. 154(b) by 232 days.

(21) Appl. No.: 14/860,193

(22) Filed: Sep. 21, 2015

(65) Prior Publication Data

US 2016/0274275 A1 Sep. 22, 2016

(30) Foreign Application Priority Data

Mar. 16, 2015 (KR) .................. 10-2015-0036054

(51) Int. Cl.
| | | |
|---|---|---|
| *G02F 1/1335* | (2006.01) | |
| *G02B 1/10* | (2015.01) | |
| *G02F 1/1333* | (2006.01) | |
| *G09F 9/00* | (2006.01) | |

(52) U.S. Cl.
CPC ......... *G02B 1/10* (2013.01); *G02F 1/133308* (2013.01); *G02F 1/133528* (2013.01); *G09F 9/00* (2013.01); *G02F 2001/133331* (2013.01)

(58) Field of Classification Search
CPC ..................... G02F 1/133528; G02F 1/133308
See application file for complete search history.

(56) References Cited

U.S. PATENT DOCUMENTS

| | | | | |
|---|---|---|---|---|
| 9,219,250 B2 * | 12/2015 | Jeong | ................... | H01L 51/5275 |
| 2010/0289984 A1 * | 11/2010 | Kishioka | .............. | G02B 5/3016 |
| | | | | 349/62 |
| 2011/0164329 A1 * | 7/2011 | Jiang | ........................ | G02B 3/08 |
| | | | | 359/742 |
| 2014/0153092 A1 * | 6/2014 | Lee | ......................... | G02B 27/26 |
| | | | | 359/465 |
| 2014/0285708 A1 * | 9/2014 | Kwon | ................... | H04N 5/2254 |
| | | | | 348/360 |
| 2014/0367873 A1 * | 12/2014 | Yang | .................... | G02B 5/0215 |
| | | | | 264/2.5 |
| 2015/0125662 A1 * | 5/2015 | Kim | ....................... | B41M 3/003 |
| | | | | 428/156 |
| 2015/0286062 A1 * | 10/2015 | Zheng | .................... | G02B 3/005 |
| | | | | 349/57 |

(Continued)

FOREIGN PATENT DOCUMENTS

| | | |
|---|---|---|
| JP | 07120743 A | 5/1995 |
| KR | 1020020081101 A | 10/2002 |
| KR | 1020120081362 A | 7/2012 |

*Primary Examiner* — Timothy L Rude
(74) *Attorney, Agent, or Firm* — Cantor Colburn LLP

(57) ABSTRACT

A display device includes a display panel, an optical film arranged on an upper portion of the display panel and including first and second intaglio pattern portions having different depths from each other, a bonding member configured to contact at least a part of the display panel and a surface of the first intaglio pattern portion and an air layer configured to fill between a surface of the second intaglio pattern portion and the display panel.

12 Claims, 14 Drawing Sheets

(56) References Cited

U.S. PATENT DOCUMENTS

| | | | | |
|---|---|---|---|---|
| 2015/0293402 A1* | 10/2015 | Shinkai | ............... | G02F 1/13476 349/15 |
| 2016/0178958 A1* | 6/2016 | Son | ................... | G02F 1/133504 349/96 |
| 2016/0320537 A1* | 11/2016 | Ko | ................... | B29D 11/00278 |

* cited by examiner

[FIG. 1]
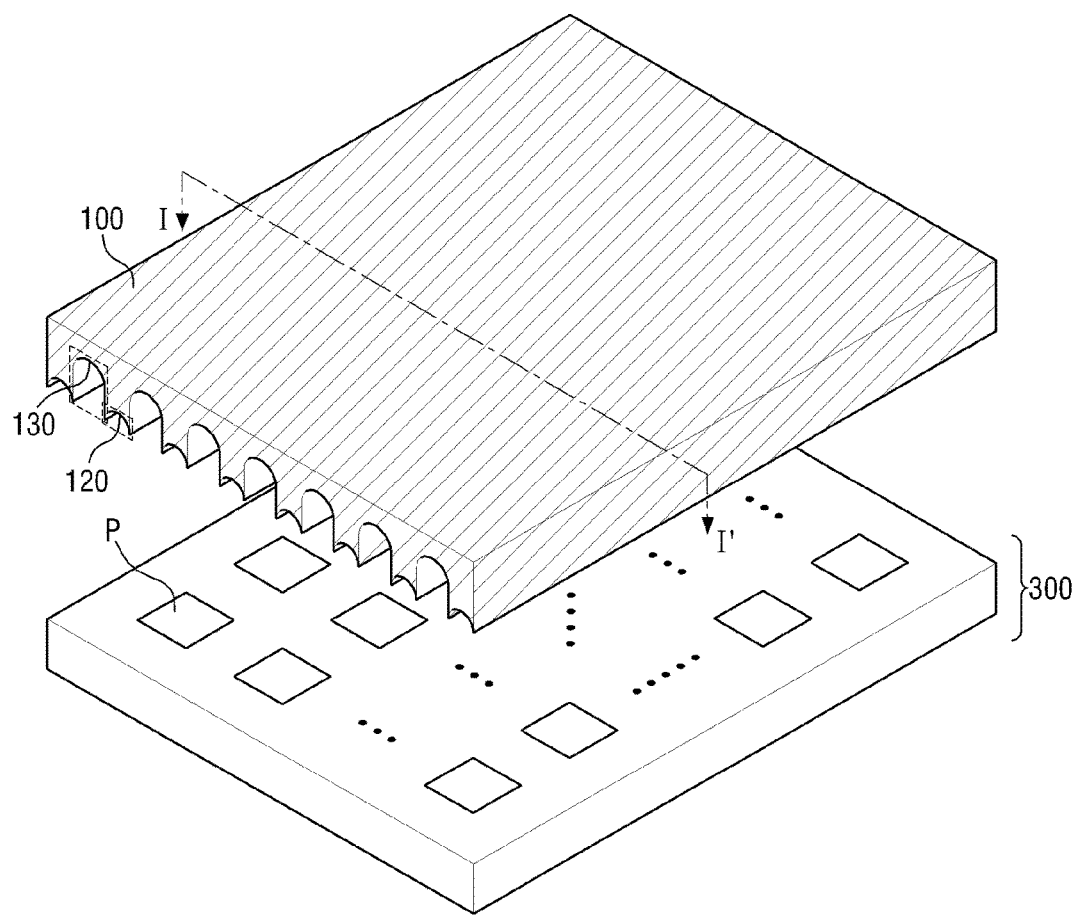

[FIG. 2]
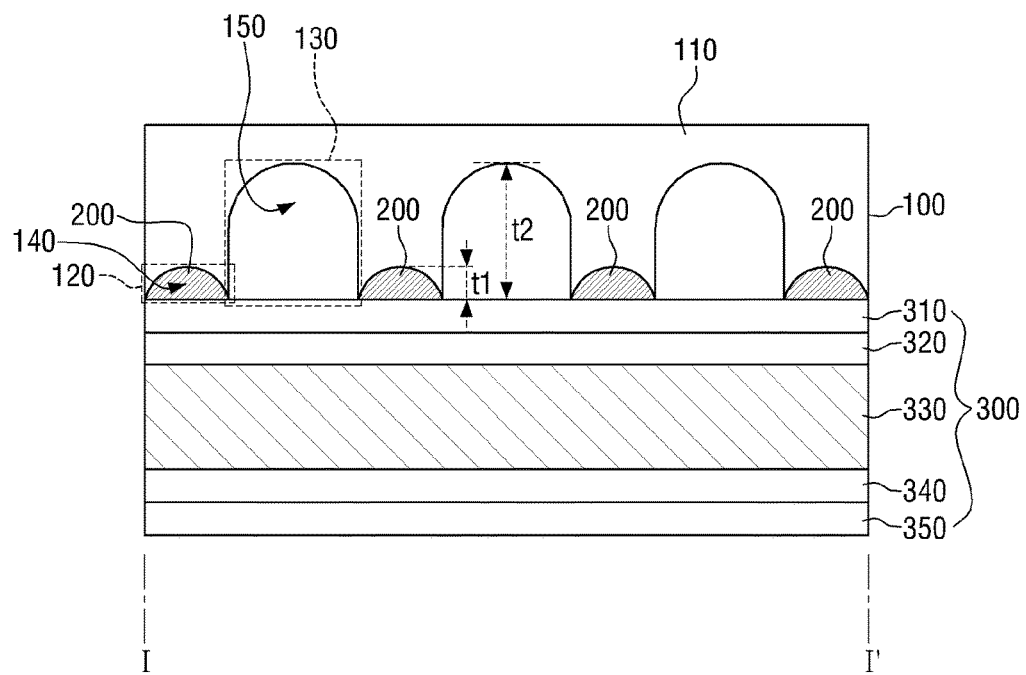

[FIG. 3]
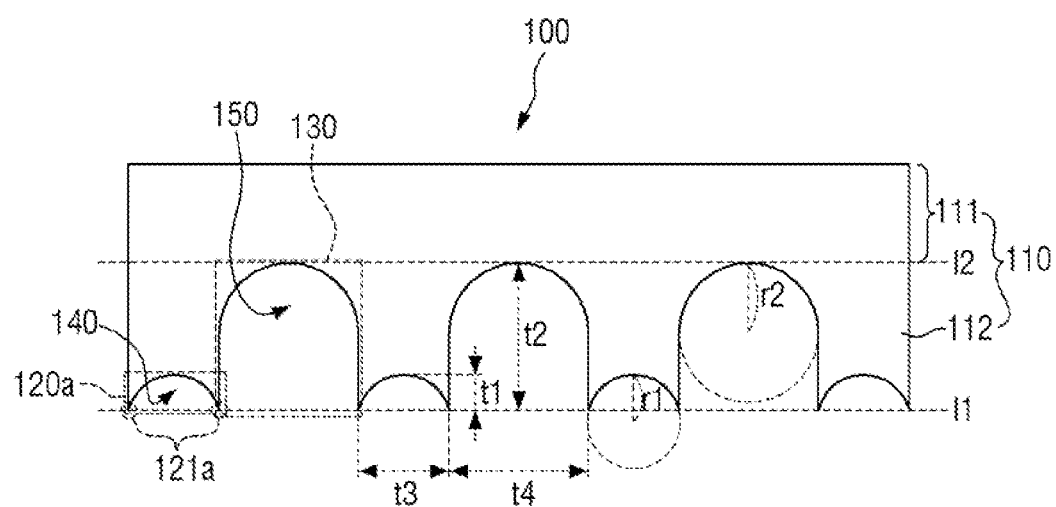

[FIG. 4]
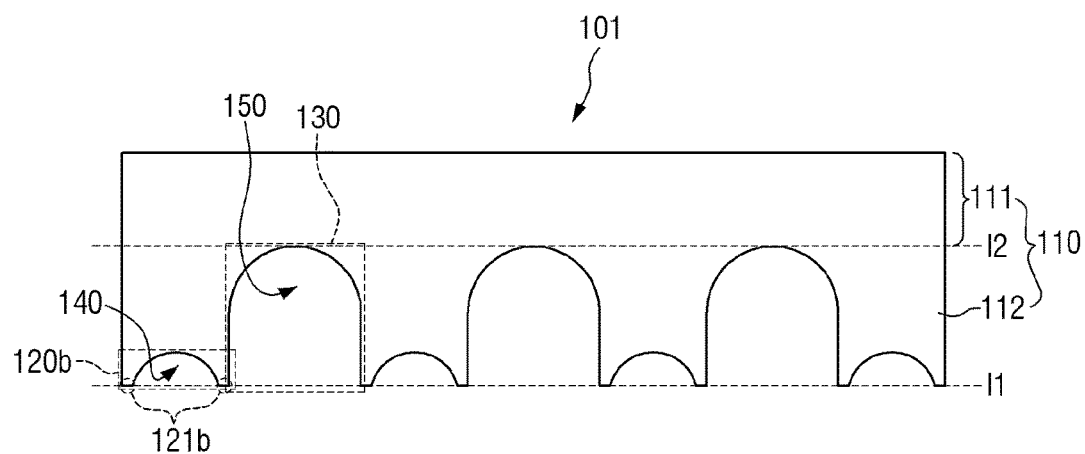
[FIG. 5]
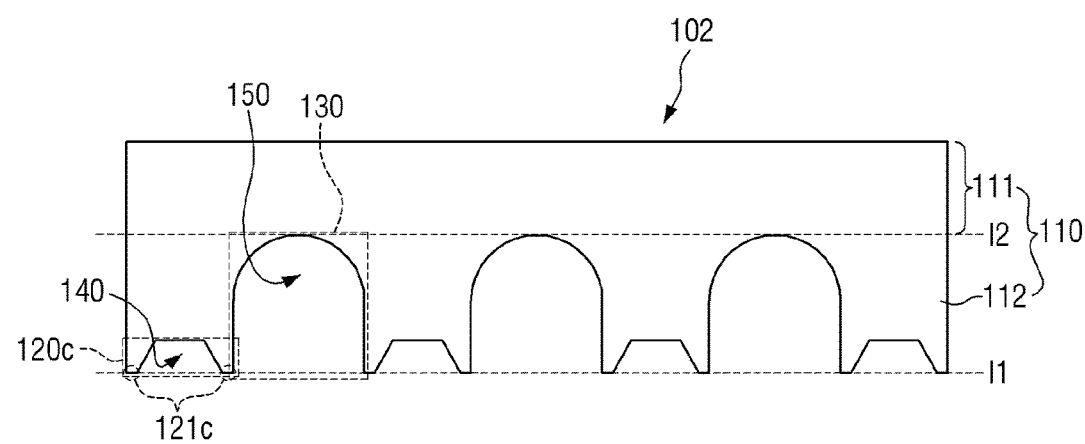

[FIG. 6]
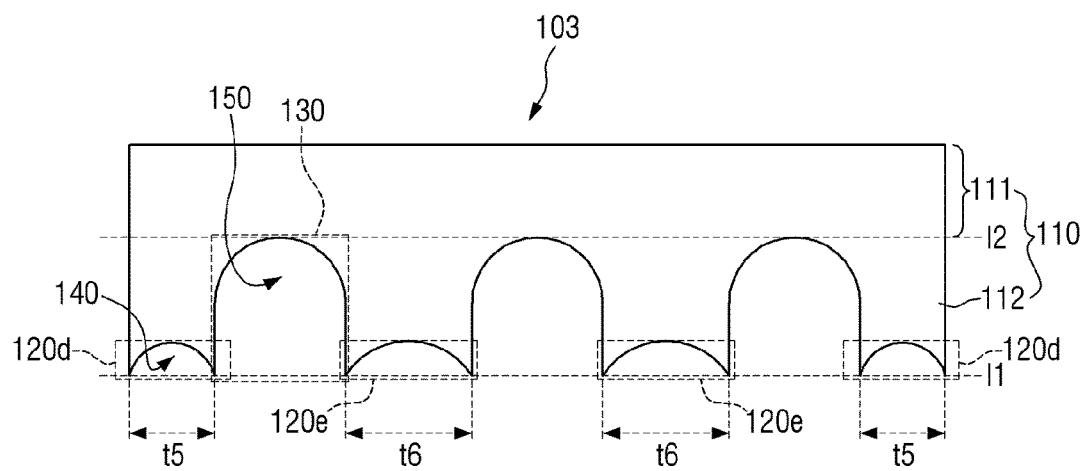
[FIG. 7A]
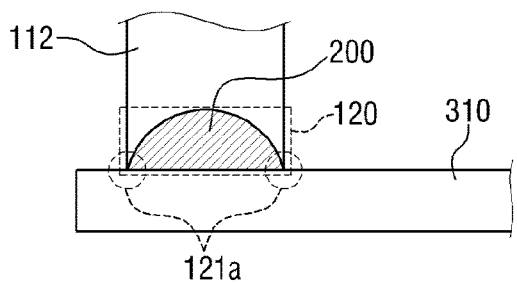

[FIG. 7B]
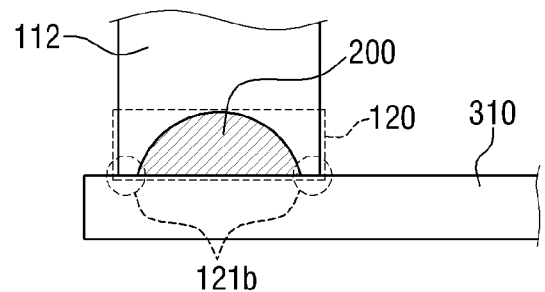
[FIG. 7C]
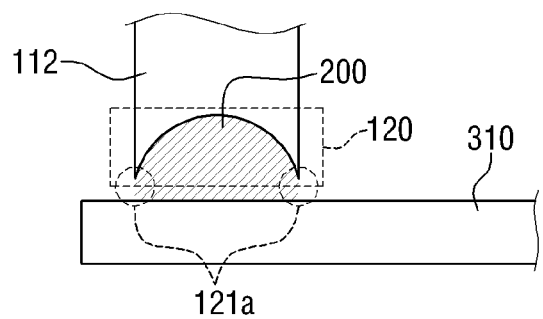
[FIG. 7D]
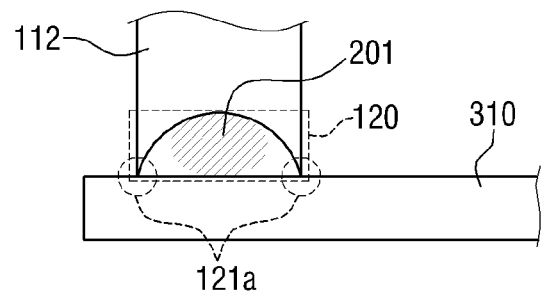

[FIG. 8]
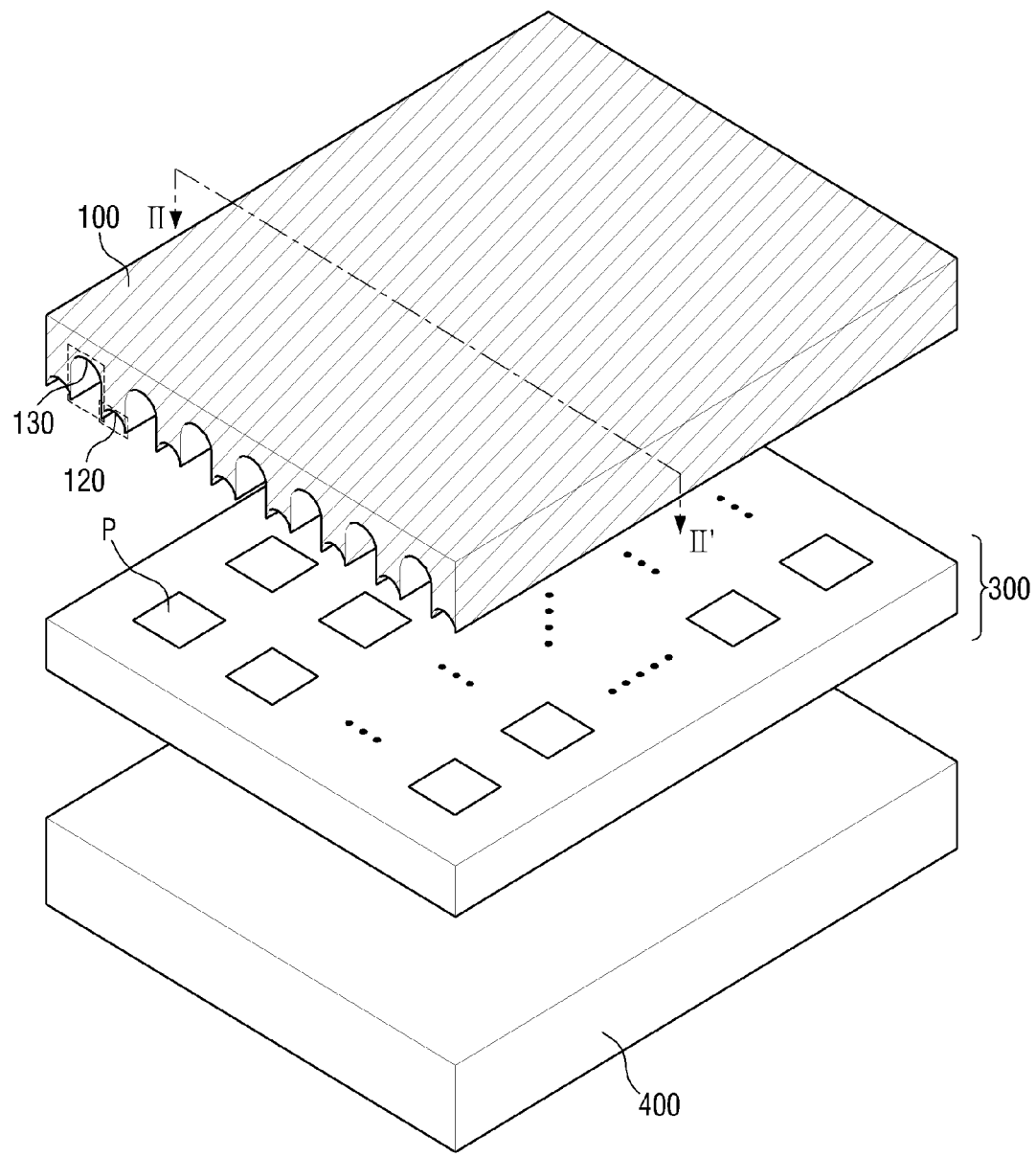

[FIG. 9]
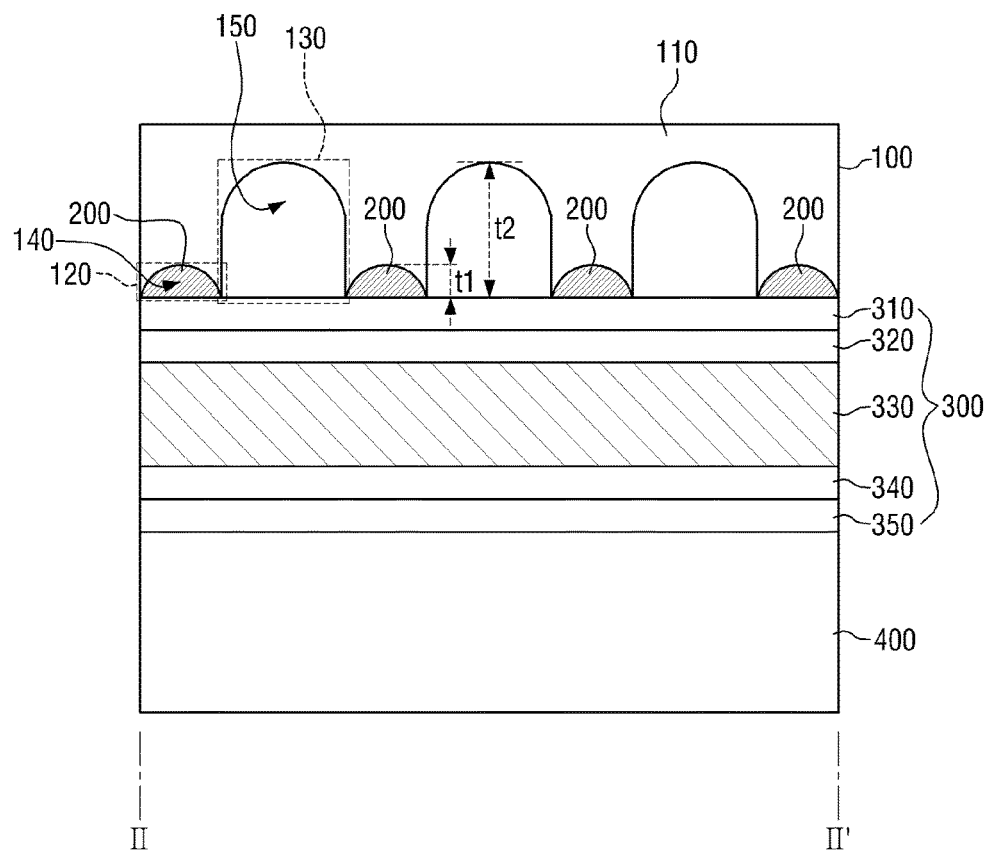

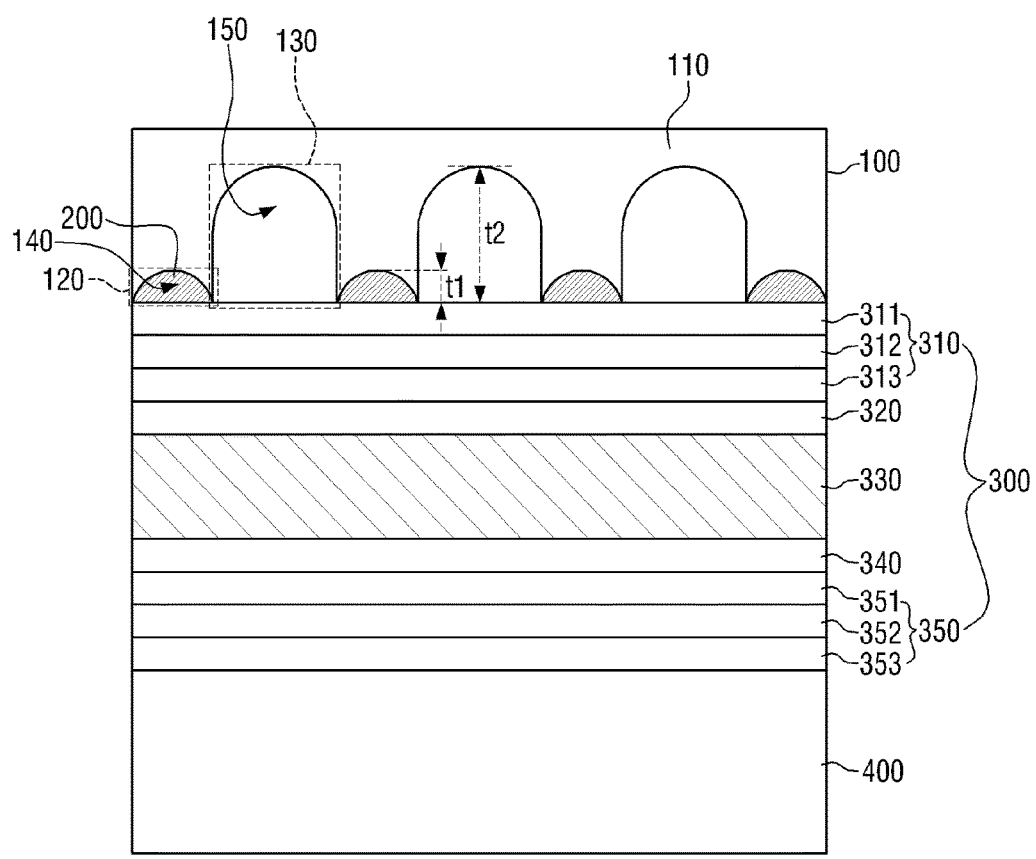
[FIG. 10]

[FIG. 11]
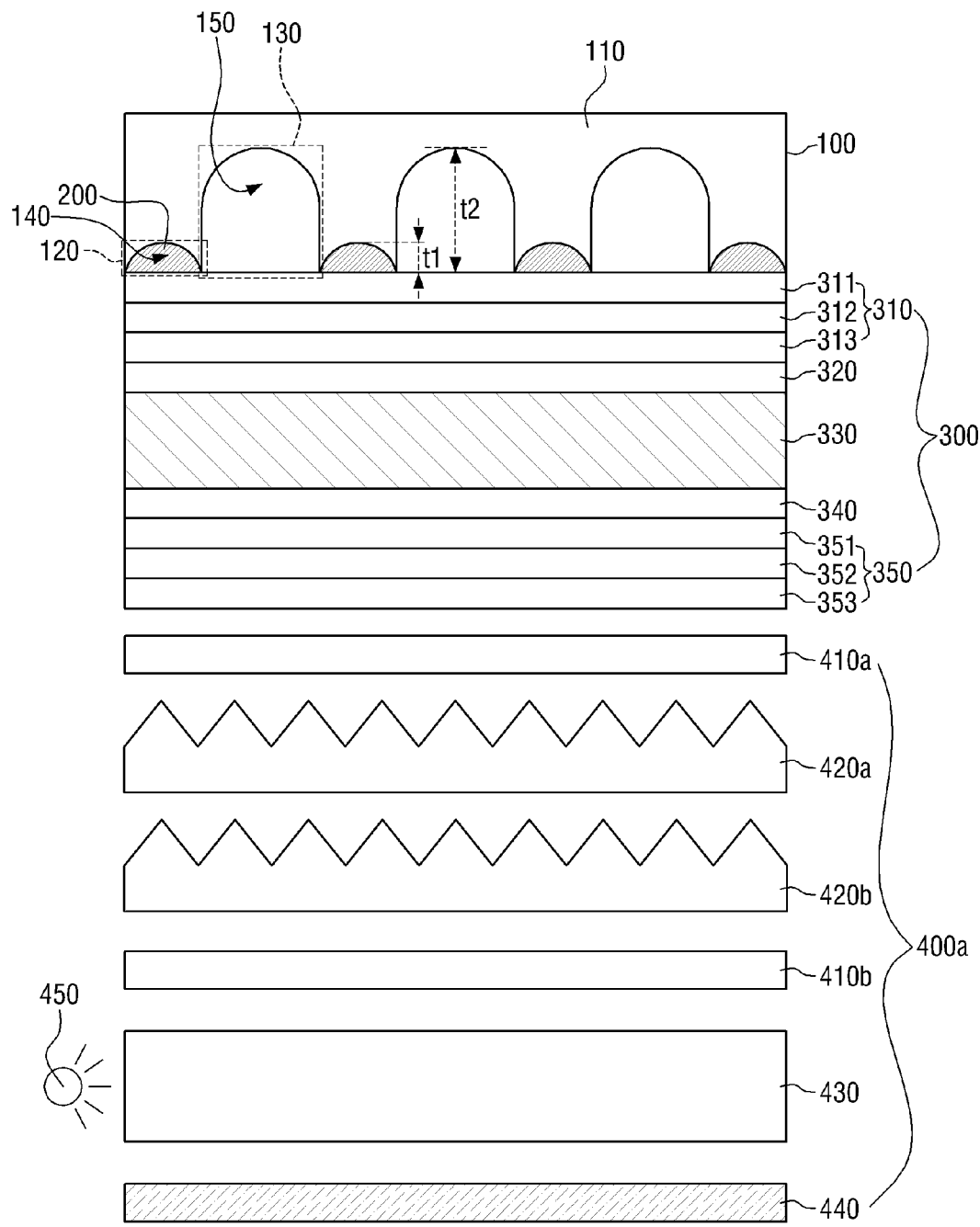

[FIG. 12]
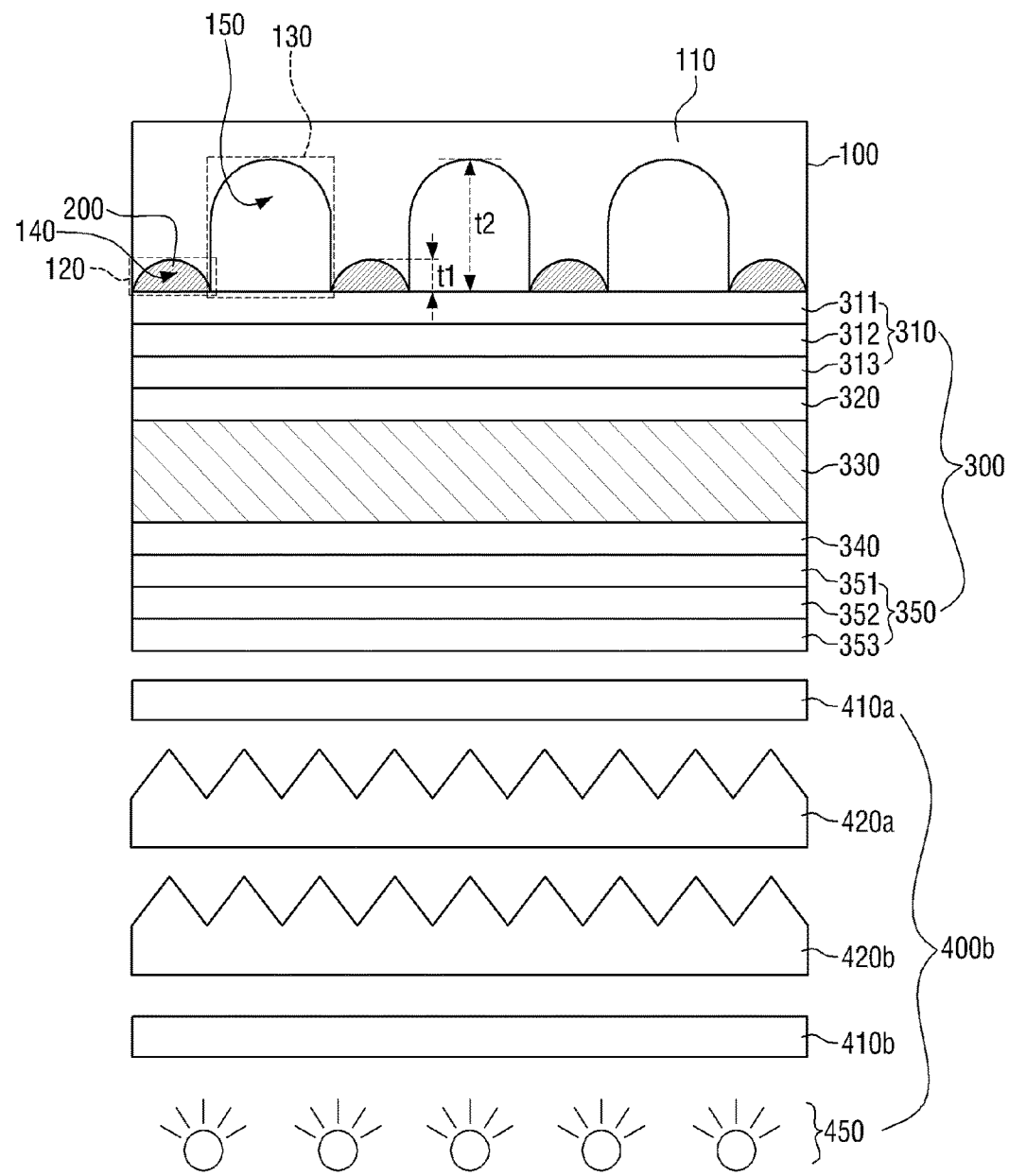

【FIG. 13】
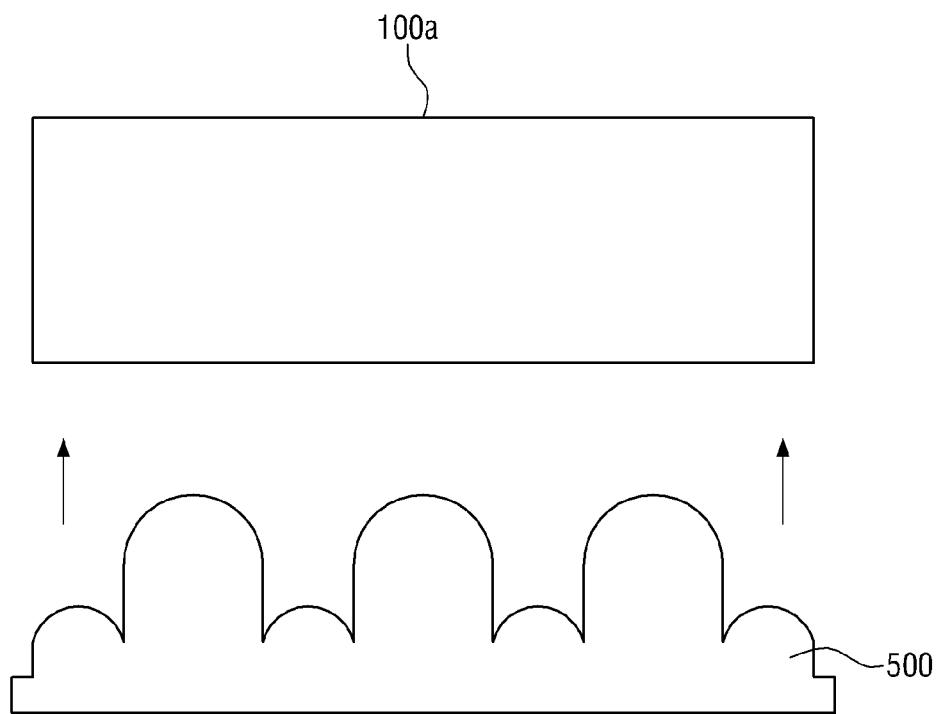

【FIG. 14】
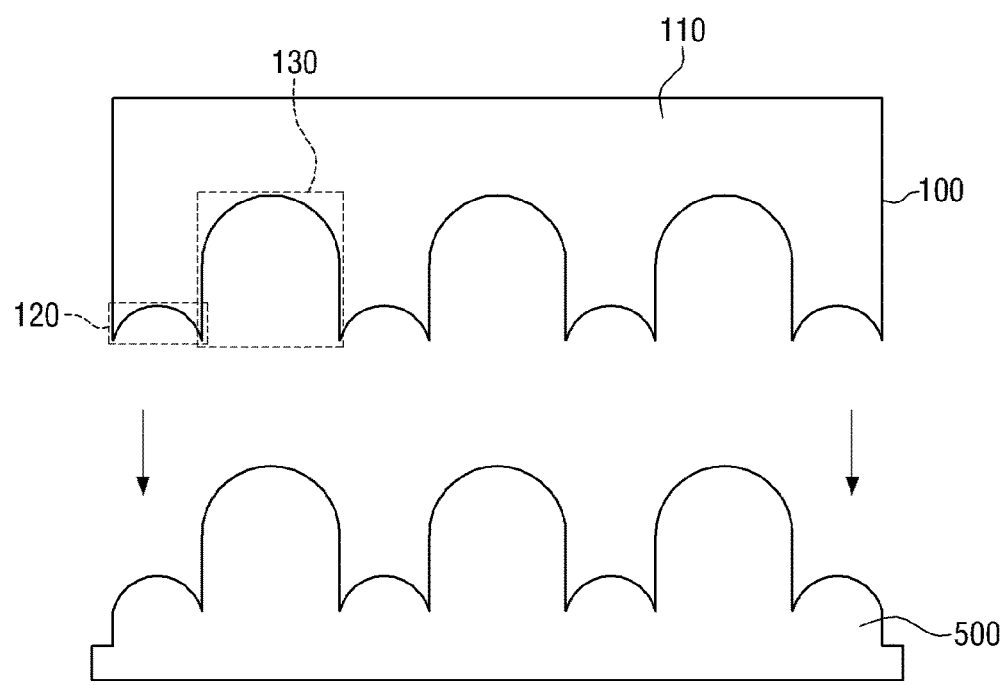

【FIG. 15】
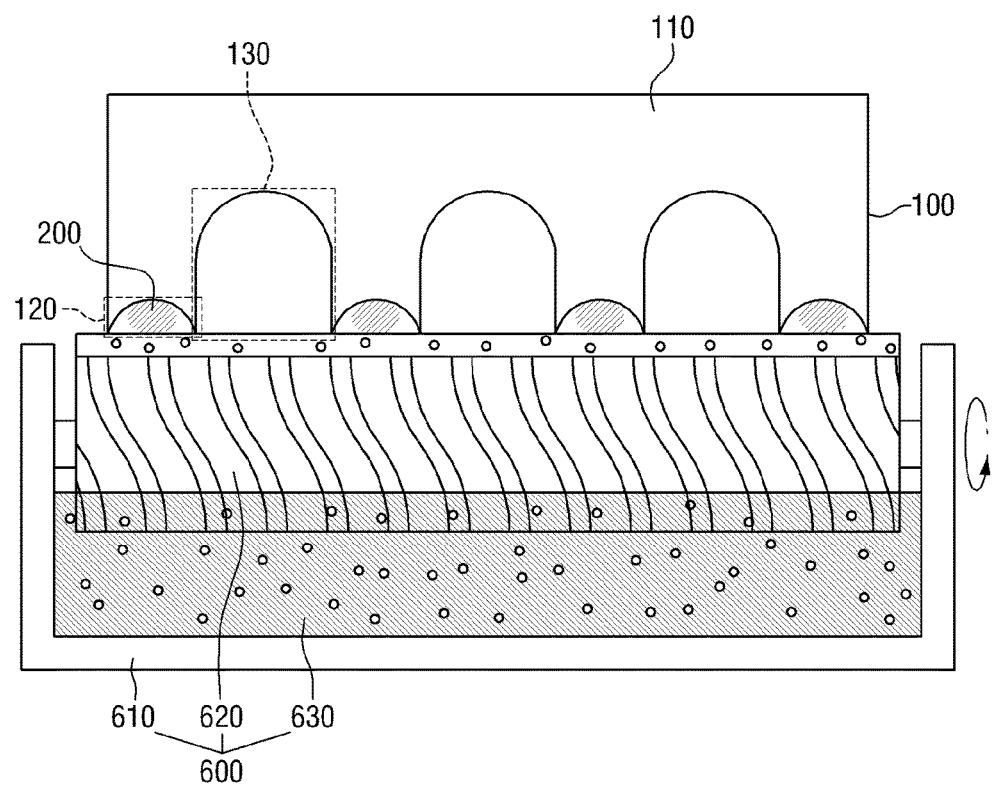

DISPLAY DEVICE AND OPTICAL FILM INCLUDED THEREIN

This application claims priority to Korean Patent Application No. 10-2015-0036054, filed on Mar. 3, 2015, and all the benefits accruing therefrom under 35 U.S.C. §119, the content of which in its entirety is incorporated herein by reference.

BACKGROUND

1. Field

The invention relates to a display device and an optical film included in the display device.

2. Description of the Prior Art

With the development of multimedia, the importance of display devices has increased. To cope with this, various kinds of display devices, such as a liquid crystal display ("LCD") and an organic light emitting display ("OLED"), have been used.

Among them, the LCD may include thin film transistors, pixel electrodes, common electrodes, and liquid crystals interposed between two substrates that face each other. Operation modes of a liquid crystal layer may include a twisted nematic mode and an electrically controlled birefringence mode. The electrically controlled birefringence mode may include a vertical alignment mode, an optically compensated birefringence ("OCB") mode, and an in-plane switching ("IPS") mode. According to an example of a driving method of an LCD, when an electric field is formed between the pixel electrode and the common electrode, liquid crystals in the liquid crystal layer may be arranged at an angle that is smaller than 90° with respect to the pixel electrode or the common electrode to implement an image that is gradually brightening.

Recently, research has been conducted for expanding a viewing angle on the side in addition to a viewing angle in front of the LCD.

SUMMARY

Accordingly, one subject to be solved by the invention is to provide a display device, which can prevent adhesives from flowing into an inside of an intaglio pattern portion and thus can prevent the degree of pattern scattering from being affected thereby during a pressing process.

Another subject to be solved by the invention is to provide a display device, which can provide a superior side viewing angle while implementing superior front luminance.

Still another subject to be solved by the invention is to provide an optical film, which can provide a superior side viewing angle while implementing superior front luminance.

Additional advantages, subjects, and features of the invention will be set forth in part in the description which follows and in part will become apparent to those having ordinary skill in the art upon examination of the following or may be learned from practice of the invention.

According to an exemplary embodiment of the invention, a display device includes a display panel, an optical film arranged on an upper portion of the display panel and including first and second intaglio pattern portions having different depths, a bonding member configured to contact at least a part of the display panel and a surface of the first intaglio pattern portion and an air layer configured to fill between a surface of the second intaglio pattern portion and the display panel.

In an exemplary embodiment, a depth of the second intaglio pattern portion may be greater than a depth of the first intaglio pattern portion.

In an exemplary embodiment, a depth of the first intaglio pattern portion may be equal to or greater than about 2 micrometers (μm).

In an exemplary embodiment, an aspect ratio of the second intaglio pattern portion may be about 0.5 to about 1.6.

In an exemplary embodiment, at least one of a width and a depth of the second intaglio pattern portion may be equal to or greater than about 10 μm.

In an exemplary embodiment, a refractive index of the optical film may be about 1.45 to about 1.65.

In an exemplary embodiment, a difference between a refractive index of the optical film and a refractive index of the air layer may be equal to or greater than about 0.45.

In an exemplary embodiment, the bonding member may include a sticking or adhesive material.

In an exemplary embodiment, the bonding member may include at least one of acrylic based adhesives, silicon based adhesives, urethane based adhesives, polyvinyl butyral adhesives, ethylene-vinyl acetate based adhesives, polyvinyl ether, and melamine resin.

In an exemplary embodiment, the display panel may include a first polarizing plate, a liquid crystal layer arranged on an upper portion of the first polarizing plate, and a second polarizing plate arranged on an upper portion of the liquid crystal layer, and the optical film may be arranged on an upper portion of the second polarizing plate.

In an exemplary embodiment, the first intaglio pattern portion may include one surface that directly contacts with the display panel.

In an exemplary embodiment, the one surface that directly contacts the display panel may have a sticking or adhesive property.

In other exemplary embodiment of the invention, an optical film includes a base material and first and second pattern portions disposed in intaglio from one surface of the base material with different depths from each other, where a difference between a refractive index of the base material and a refractive index of an inside of the second pattern portion is equal to or greater than about 0.45, and the depth of the second pattern portion is greater than the depth of the first pattern portion.

In an exemplary embodiment, an aspect ratio of the second pattern portion may be about 0.5 to about 1.6, and the refractive index of the base material may be about 1.45 to about 1.65.

In an exemplary embodiment, the first pattern portion may include an edge portion positioned on both side surfaces in a width direction and including one surface having a predetermined width, and the one surface of the edge portion has a sticking or adhesive property.

In an exemplary embodiment, the refractive index of the base material may be greater than the refractive index of the second pattern portion.

In an exemplary embodiment, the refractive index of the base material may be about 1.45 to about 1.65, and the refractive index of the inside of the second pattern portion may be about 1.0.

In an exemplary embodiment, the optical film may further include an air layer that fills the inside of the second pattern portion.

In an exemplary embodiment, a cross-section of the first pattern portion may include one of polygonal, semi-circular, and semi-elliptical cross-sections.

In an exemplary embodiment, a cross-section of the second pattern portion may be in an elliptical shape.

In an exemplary embodiment, the display device according to an exemplary embodiment of the invention can prevent the adhesives from flowing into the inside of the intaglio pattern portion and thus can prevent the degree of pattern scattering from being affected thereby during the pressing process.

In an exemplary embodiment, the display device according to an exemplary embodiment of the invention can provide the superior side viewing angle while implementing the superior front luminance.

In an exemplary embodiment, the effects according to the invention are not limited to the contents as exemplified above, but further various effects are included in the description.

BRIEF DESCRIPTION OF THE DRAWINGS

The above and other exemplary embodiments, features and advantages of the invention will be more apparent from the following detailed description taken in conjunction with the accompanying drawings, in which:

FIG. 1 is a perspective view of an exemplary embodiment of a display device according to the invention;

FIG. 2 is a cross-sectional view of the display device of FIG. 1 taken along line I-I';

FIG. 3 is a cross-sectional view of an exemplary embodiment of an optical film illustrated in FIG. 1 according to the invention;

FIG. 4 is a cross-sectional view of another exemplary embodiment of an optical film illustrated in FIG. 1 according to the invention;

FIG. 5 is a cross-sectional view of another exemplary embodiment of an optical film illustrated in FIG. 1 according to the invention;

FIG. 6 is a cross-sectional view of another exemplary embodiment of an optical film illustrated in FIG. 1 according to the invention;

FIGS. 7A to 7D are cross-sectional views illustrating examples of a projection portion of an optical film illustrated in FIG. 1;

FIG. 8 is a perspective view of the display device of FIG. 1 to which a backlight unit is added;

FIG. 9 is a cross-sectional view of the display device of FIG. 8 taken along line II-II';

FIGS. 10 to 12 are views illustrating an exemplary embodiment of a display device according to the invention; and FIGS. 13 to 15 are cross-sectional views explaining a method for manufacturing an optical film illustrated in FIG. 1 by stages.

DETAILED DESCRIPTION

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present between the element and the another element. In contrast, when an element is referred to as being "directly on", "directly connected to" or "directly coupled to" another element or layer, there are no intervening elements or layers present between the element and the another element. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the invention will be described with reference to the accompanying drawings.

Referring to FIGS. 1 and 2, a display device according to an exemplary embodiment of the invention may include an optical film 100, a bonding member 200, and a display panel 300.

The optical film 100 may be arranged on an upper portion of the display panel 300. As an example, the optical film 100 may be a lenticular film, but is not limited thereto. The optical film 100 may include first and second intaglio pattern portions 120 and 130 having different depths. More specifically, the depth of the second intaglio pattern portion 130 may be greater than the depth of the first intaglio pattern portion 120. The optical film 100 may include a plurality of first intaglio pattern portions 120, and the plurality of first intaglio pattern portions 120 may be arranged to be spaced apart from one another for a predetermined distance. Further, the optical film 100 may include a plurality of second intaglio pattern portions 130, and the plurality of second intaglio pattern portions 130 may be alternately arranged with the plurality of first intaglio pattern portions 120. This will be described with reference to FIG. 2.

The bonding member 200 may be positioned between the optical film 100 and the display panel 300. More specifically, the bonding member 200 may be positioned between the surface of the first intaglio pattern portion 120 and the display panel 300 in the configuration of the optical film 100. The bonding member 200 may completely fill in a space between the surface of the first intaglio pattern portion 120 and the display panel 300, or may partially fill in the space. The optical film 100 may be combined with the display panel 300 through the bonding member 200. The bonding member 200 may be positioned only between the surface of the first intaglio pattern portion 120 and the display panel 300, and may not contact the surface of the second intaglio pattern portion 130. This will be described later.

The display panel 300 is a portion that displays an image, and may include a plurality of pixel portions P. In an exemplary embodiment, the plurality of pixel portions P may be arranged on the display panel 300, for example, in the form of a matrix. That is, the plurality of pixel portions P may be uniformly arranged in horizontal and vertical directions in accordance with a predetermined rule. In an exemplary embodiment, each of the plurality of pixel portions P may be one pixel that displays an image, and each pixel may present one of red, green, and blue, for example. As described above, in an exemplary embodiment, the display panel 300 may be a plasma display panel ("PDP"), a plasma address liquid crystal ("PALC") display panel, a liquid crystal display ("LCD") panel, or an organic light emitting diode ("OLED") panel. However, for convenience in explanation, it is exemplified that the display panel 300 is a liquid crystal panel in the description.

FIG. 2 is a cross-sectional view of the display device of FIG. 1 taken along line I-I'. FIG. 3 is a cross-sectional view of an optical film 100 illustrated in FIG. 1 according to an exemplary embodiment of the invention, FIG. 4 is a cross-sectional view of an optical film 100 illustrated in FIG. 1 according to another embodiment of the invention, and FIG. 5 is a cross-sectional view of an optical film 100 illustrated in FIG. 1 according to another embodiment of the invention. FIG. 6 is a cross-sectional view of an optical film 100 illustrated in FIG. 1 according to another embodiment of the invention. The first intaglio pattern portion 120 may include the first to fourth embodiments (refer to FIGS. 3 to 6), and may be denoted by reference numerals 120a to 120d (refer to FIGS. 3 to 6). However, with respect to the contents that are common to the respective embodiments, the first intaglio pattern portion is denoted by the reference numeral 120.

The optical film 100 may include a base material 110 and the first and second intaglio pattern portions 120 and 130.

In an exemplary embodiment, the base material 110 may include a material that is penetrated by light. In an exemplary embodiment, the base material 110 may include photocurable resin or thermosetting resin, for example. The base material may include one virtual surface 11 (refer to FIG. 3) that contacts the display panel 300 and the other surface that faces the virtual surface 11. The base material 110 may include a flat portion 111 and a plurality of projection portions 112 (refer to FIG. 3). In the following description, it is assumed that one surface of the base material 110 is the virtual surface 11 (refer to FIG. 3) that contacts the display panel 300. Further, in the description, it is assumed that one surface of the flat portion 111 is a virtual surface 12 (refer to FIG. 3) that is spaced apart by t2 from the one surface of the base material 110. Accordingly, the plurality of projection portions 112 may be arranged on the one surface of the flat portion 111, and the other surface (the other surface of the base material 110) that faces the one surface of the flat portion 111 may be substantially flat since the projection portions 112 are not arranged thereon, but are not limited thereto. The plurality of projection portions 112 may be arranged on the other surface of the flat portion 111, or may be arranged on both the one surface and the other surface of the flat portion 111. The second intaglio pattern portion 130 may be disposed on a part of the one surface of the flat portion 111, on which the plurality of projection portions 112 are not arranged, and the first intaglio pattern portion 120 may be disposed on end portions of the plurality of projection portions 112.

The first intaglio pattern portion 120 may be disposed in intaglio to have a predetermined depth t1 on the one surface of the base material 110. That is, the depth t1 of the first intaglio pattern portion 120 may be defined by a distance measured from the one surface of the base material 110 to a center portion of the first intaglio pattern portion 120. In an exemplary embodiment, the depth t1 may be equal to or larger than about 2 micrometers (μm), for example. Referring to FIG. 3, the first intaglio pattern portion 120 may have a predetermined width t3. In an exemplary embodiment, the width t3 of the first intaglio pattern portion 120 may be defined by a distance measured from one side surface of the first intaglio pattern portion 120 to the other side surface that faces the one side surface, and for example, may be equal to or larger than about 10 μm, for example.

The second intaglio pattern portion 130 may be provided in intaglio to have a predetermined depth t2 on the one surface of the base material 110. That is, the depth t2 of the second intaglio pattern portion 130 may be defined by a distance measured from the one surface of the base material 110 to a center portion of the second intaglio pattern portion 130. In an exemplary embodiment, the depth t2 may be equal to or larger than about 10 μm, for example. That is, the depth t2 of the second intaglio pattern portion 130 may be greater than the depth t1 of the first intaglio pattern portion 120 (t1<t2). The second intaglio pattern portion 130 may have a predetermined width t4. The width t4 of the second intaglio pattern portion 130 may be defined by a distance measured from one side surface of the second intaglio pattern portion 130 to the other side surface that faces the one side surface, and for example, may be equal to or larger than about 10 μm, for example. Accordingly, the width t4 of the second intaglio pattern portion 130 may be equal to or smaller than the width t3 of the first intaglio pattern portion 120 (t3>t4). In the case where the width t3 of the first intaglio pattern portion 120 is larger than the width t4 of the second intaglio pattern portion 130, a large amount of light that is emitted in a normal direction of the upper surface of the display panel 300 can penetrate the base material. That is, at least one of the depth t2 and the width t4 of the second intaglio pattern portion 130 may be equal to or larger than about 10 micrometers (μm). In an exemplary embodiment, the aspect ratio of the second intaglio pattern portion 130 may be in the range of about 0.5 to about 1.6, for example. In this case, the aspect ratio of the second intaglio pattern portion 130 corresponds to a value that is obtained by dividing the depth t2 of the second intaglio pattern portion 130 by the width t4.

An air layer may fill in an inside 150 of the second intaglio pattern portion 130. In this case, the inside 150 of the second intaglio pattern portion 130 may refer to a space between the surface of the second intaglio pattern portion 130 and the display panel 300. That is, the air layer may fill between the second intaglio pattern portion 130 and the upper portion of the display panel 300. In this case, the term "fill" means that the air layer fills between the surface of the second intaglio pattern portion 130 and the display panel 300 to eliminate an empty space between them. In an exemplary embodiment, the air layer may have a refractive index that substantially approaches 1. In this case, the refractive index of the base material 110 may be higher than the refractive index of the second intaglio pattern portion 130. In an exemplary embodiment, the refractive index of the base material may be in the range of about 1.45 to about 1.65, for example. Accordingly, the difference in refractive index between the base material 110 and the air layer having the refractive index that approaches 1 may be equal to or greater than about 0.45, for example. According to the display device in an exemplary embodiment of the invention, a color shift reduction effect can be increased, and a view angle of a backlight unit 400 (refer to FIG. 8) can be maximized. Further, in an exemplary embodiment, the aspect ratio of the plurality of second intaglio pattern portions 130 is within the range of about 0.5 to about 1.6, and the difference in refractive index between the base material 110 and the second intaglio pattern portions 130 is equal to or greater than about 0.45, for example. Accordingly, the front luminance of the display device according to an exemplary embodiment of the invention can be increased, and the left/right viewing angle can be extended.

The bonding member 200 may be positioned on an inside 140 of the first intaglio pattern portion 120. The inside of the first intaglio pattern portion 120 may mean a space between the surface of the first intaglio pattern portion 120 and the display panel 300. In an exemplary embodiment, the bonding member 200 may be adhesives which include at least one of acrylic based adhesives, silicon based adhesives, urethane based adhesives, polyvinyl butyral adhesives, ethylene-vinyl acetate based adhesives, polyvinyl ether, and melamine resin, for example. The optical film 100 may be laminated on the upper surface of the display panel 300 through the bonding member 200 that is positioned on the inside 140 of the first intaglio pattern portion 120. Accordingly, the optical film 100 may be bonded to the display panel through the bonding member 200 that is positioned on the inside 140 of the first intaglio pattern portion 120 even without a separate adhesive layer. Further, according to the display device of an exemplary embodiment of the invention, the optical film 100 can be directly laminated on the upper surface of the display panel 300 to reduce a gap distance between them, and thus a double image phenomenon and a haze phenomenon can be prevented from occurring. The bonding member is not necessarily limited to the adhesives, but may include a resin component. Accordingly, the optical film 100 and the display panel 300 can be bonded together through a thermosetting method.

Further, according to the display device of an exemplary embodiment of the invention, since the bonding member 200 is positioned on the inside 140 of the first intaglio pattern portion 120, the bonding member 200 can be prevented from flowing into the inside 150 of the second intaglio pattern portion 130, and thus the degree of pattern scattering can be prevented from being affected thereby during a pressing process. So far as the bonding member 200 can be prevented from flowing into the inside of the second intaglio pattern portion 130 during the pressing process, the cross-sectional shape or the shape of the first intaglio pattern portion 120 may not be separately limited.

The display panel 300 may include an upper polarizing plate 310, a first substrate 320, a liquid crystal layer 330, a second substrate 340, and a lower polarizing plate 350. The liquid crystal layer 330 may be arranged between the first substrate 320 and the second substrate 340.

The upper polarizing plate 310 may include one surface on which the optical film 100 is laminated and the other surface that faces the one surface. In the display device according to an exemplary embodiment of the invention, the upper polarizing plate 310 may be attached to a position where a viewer can visually recognize an image. As described above, the optical film 100 may be laminated on the one surface of the upper polarizing plate 310 through the bonding member 200 that fills the inside 140 of the plurality of first intaglio pattern portions 120. Further, an air layer may fill between the plurality of second intaglio pattern portion 130 and the upper polarizing plate 310. Polarizer penetration axes of the upper polarizing plate 310 and the lower polarizing plate 350 may be orthogonal to each other or may be in parallel to each other. The lower polarizing plate 350 may include one surface on which the second substrate 340 is laminated and the other surface that faces the one surface. The upper polarizing plate 310 may include polarizer protection films 311 and 313 and a polarizer 312 (refer to FIG. 10). Further, the lower polarizing plate 350 may include polarizer protection films 351 and 353 and a polarizer 352 (refer to FIG. 10). This will be described later with reference to FIG. 10.

The first substrate 320 may include one surface on which the upper polarizing plate 310 is laminated and the other surface that faces the one surface. In an exemplary embodiment, the first substrate 320 may be a thin film transistor ("TFT") array substrate. On the first substrate 320, a liquid crystal driving electrode, a wiring pattern, a TFT element, and an alignment layer may be provided. In an exemplary embodiment, a gate electrode, a gate insulating layer, a semiconductor layer, an ohmic contact layer, a TFT composed of source/drain electrodes, and a pixel electrode may be disposed on a base material that includes a transparent insulating material, such as glass or plastic.

The second substrate 340 may include one surface on which the liquid crystal layer 330 is laminated and the other surface that faces the one surface. On the surface of the second substrate 340 that is opposite to the first substrate 320, a color filter, a common electrode, and an alignment layer may be disposed, and when needed, a black matrix ("BM") may be disposed. More specifically, on the lower surface of the base material that includes a transparent insulating material, such as glass or plastic, the BM for preventing light leakage, the color filter of red, green, or blue, for example, and the common electrode may be disposed.

In an exemplary embodiment, a plastic substrate that may be used as the first substrate 320 or the second substrate 340 may be a plastic substrate that includes polyethylene terephthalate ("PET"), polycarbonate ("PC"), polyimide ("PI"), polyethylene naphthalate ("PEN"), polyether sulfone ("PES"), polyarylate ("PAR"), or cycloolefin copolymer ("COC"), which may be used for a display, but is not limited thereto. Further, the first substrate 320 and the second substrate 340 may include a flexible material.

In the case where the display panel 300 is an LCD panel, an operation mode may be a twisted nematic ("TN") mode or an electrically controlled birefringence mode. Further, the electrically controlled birefringence mode may include a vertical alignment mode, an optically compensated birefringence ("OCB") mode, and an in-plane switching ("IPS") mode. In the TN mode, when there is not a voltage difference between the pixel electrode and the common electrode, i.e., electric field generation electrodes, and thus an electric field is not applied to the LCD panel, liquid crystals of the LCD panel may be arranged so that their long-axis direction is in parallel to the surfaces of the first substrate 320 and the second substrate 340. Further, the liquid crystals of the LCD panel may have a 90° twisted structure from the first substrate 320 to the second substrate 340. In this case, polarization of the linearly polarized light may be changed due to retardation that is caused by the anisotropy of the refractive index of the liquid crystals as the light passes through the liquid crystal layer 330 of the display panel. Through adjustment of dielectric anisotropy Ac of the liquid crystals and chiral pitch or the depth of the LCD panel, i.e., cell gap, the linearly polarized light that has passed through the LCD panel may be made to be rotated by 90°.

Referring to FIG. 3, an optical film 100 having first intaglio pattern portions 120*a* according to a first embodiment will be described. The first intaglio pattern portions 120*a* may be arranged at end portions of a plurality of projection portions 112, but may not be necessarily arranged at equal intervals. The first intaglio pattern portions 120*a* may include edge portions 121*a* arranged on both side surfaces in their width direction. Accordingly, the first intaglio pattern portions 120*a* may have inclined surfaces that are provided from one surface of the base material 110 to the other surface of the base material 110. Further, the first intaglio pattern portions 120*a* may have a predetermined curvature radius r1. FIG. 3 illustrates that the plurality of first intaglio pattern portions 120*a* have the same depth t1, the same width t3, or the same curvature radius r1, but are not limited thereto. Further, second intaglio pattern portions 130 may have a predetermined curvature radius r2, which is not necessarily equal to the curvature radius r1 of the first intaglio pattern portions 120*a*. FIG. 3 illustrates that the plurality of second intaglio pattern portions 130 have the same depth t2, the same width t4, and the same curvature radius r2, but are not limited thereto.

Referring to FIG. 4, an optical film 101 including first intaglio pattern portions 120*b* according to a second embodiment will be described. The first intaglio pattern portions 120*b* may include edge portions 121*b* arranged on both side surfaces in their width direction. In this case, the edge portion 121*b* may include one surface having a predetermined width, and the one surface of the edge portion 121*b* may be disposed substantially on the same surface as the virtual surface 11 of the base material 110. That is, the one surface of the base material 110 may be a surface that directly contacts the display panel 300 (refer to FIG. 2), more specifically, the upper polarizing plate 310 (refer to FIG. 2). Accordingly, the one surface of the edge portion 121*b* may include a material having a sticking or adhesive property. Accordingly, the optical film 101 may be laminated on the upper portion of the display panel 300 through not only the bonding member 200 that is positioned on the inside 140 of the first intaglio pattern portion 120*b* but also one surface of the edge portion 121*b* having the sticking or adhesive property. Accordingly, the optical film 101 may be directly attached to the one surface of the display panel 300 so that an air layer is not interposed between the first intaglio pattern portion 120*b* and the display panel 300, and through this, the double image phenomenon and the haze phenomenon can be prevented from occurring.

Referring to FIG. 5, an optical film 102 having first intaglio pattern portions 120*c* according to a third embodiment will be described. Unlike the first intaglio pattern portions 120*b* (refer to FIG. 4) according to the second embodiment, the first intaglio pattern portions 120*c* according to the third embodiment may be in a polygonal shape, for example. However, the shapes of the first intaglio pattern portions are not limited to those according to the second and third embodiments. The first intaglio pattern portions 120*c* may include edge portions 121*c* arranged on both side surfaces in their width direction.

Referring to FIG. 6, an optical film 103 having first intaglio pattern portions 120*d* and 120*e* according to a fourth embodiment will be described. The optical film 103 according to the fourth embodiment of the invention may include the first intaglio pattern portions 120*d* and 120*e* having different widths from each other. The width t5 of the first intaglio pattern portion 120*d* may be less than the width t6 of the first intaglio pattern portion 120*e* (t5<t6). That is, the width t6 of the first intaglio pattern portion 120*e* that is positioned in the center portion of the base material 110 may be relatively greater than the width t5 of the first intaglio pattern portion 120*d* that is positioned in a boundary portion of the base material 110.

FIGS. 7A to 7D are cross-sectional views illustrating examples of a projection portion 112 of an optical film 100 illustrated in FIG. 1.

Referring to FIGS. 7A, 7B, and 7D, the projection portion 112 may include edge portions 121a and 121b that are arranged on both side surfaces in the width direction thereof. In this case, the edge portion that does not include one surface that contacts the upper polarizing plate 310 is denoted by 121a, and the edge portion that includes the one surface that contacts the upper polarizing plate 310 is denoted by 121b. In FIGS. 7A, 7B, and 7D, the projection portion 112 may directly contact with the upper polarizing plate 310, and the bonding member 200 may be positioned between the surface of the first intaglio pattern portion 120 and the upper polarizing plate 310. In contrast, in FIG. 7B, the edge portion 121b may include a surface having a predetermined width that can directly contact the upper polarizing plate 310, and the surface of the edge portion 121b may have a self-sticking or adhesive property as described above.

In FIGS. 7A and 7B, the bonding member 200 may completely fill the inside of the first intaglio pattern portion 120. In contrast, referring to FIG. 7D, the bonding member 200 may partially fill the inside of the first intaglio pattern portion 120. Referring to FIG. 7C, the edge portion 121a of the first intaglio pattern portion 120 may be laminated to be spaced apart from the upper polarizing plate 310 for a predetermined distance. In this case, the bonding member 200 may be provided with predetermined width and length on not only the inside but also the outside of the first intaglio pattern portion 120.

FIG. 8 is a perspective view of the display device of FIG. 1 to which a backlight unit 400 is added, and FIG. 9 is a cross-sectional view of the display device of FIG. 8 taken along line II-II'.

Referring to FIGS. 8 and 9, a display device according to an exemplary embodiment of the invention may further include a backlight unit 400. The backlight unit 400 may be arranged on the lower portion of the display panel 300. More specifically, the backlight unit 400 may be arranged on the lower portion of the lower polarizing plate 350. In the case where the display panel 300 is a liquid crystal panel, it corresponds to passive pixels, and a separate light source is required. Accordingly, on the lower portion of the display panel 300, the backlight unit 400 that supplies light may be arranged. When the backlight unit 400 supplies light, the display panel 300 may display various images. The backlight unit 400 will be described in more detail later with reference to FIGS. 10 to 12.

FIGS. 10 to 12 are views illustrating in more detail a display device according to an exemplary embodiment of the invention. However, duplicated explanation of the contents as described above with reference to FIGS. 1 to 9 will be omitted. Further, when an edge type backlight unit is included in the display device according to an exemplary embodiment of the invention, it is denoted by 400a (refer to FIG. 11), while when a direct type backlight unit is included in the display device, it is denoted by 400b (refer to FIG. 12).

First, referring to FIG. 10, the upper polarizing plate 310 may include the polarizer 312 including a polyvinyl alcohol based film on which iodine or dichroic dyes are dyed and aligned, and the polarizer protection films 311 and 313 may be attached to upper and lower portions of the polarizer 312, respectively. In the same manner, the lower polarizing plate 350 may also include the polarizer 352 including a polyvinyl alcohol based film on which iodine or dichroic dyes are dyed and aligned, and the polarizer protection films 351 and 353 may be attached to upper and lower portions of the polarizer 352, respectively. In an exemplary embodiment, any one of the polarizer protection films that are included in the upper polarizing plate 310 and the lower polarizing plate 350 may be omitted. In an exemplary embodiment, the polarizer protection film 311 that is disposed on the surface of the upper polarizing plate 310 that contacts the first substrate 320 may be omitted, for example. In an exemplary embodiment, the polarizer protection film 353 that is disposed on the surface of the lower polarizing plate 350 that contacts the backlight unit 400 may be omitted.

Next, referring to FIG. 11, the display device according to an exemplary embodiment of the invention may include the edge type backlight unit 400a. Accordingly, the display device according to an exemplary embodiment of the invention may include at least one light source 450, a light guide plate ("LGP") 430 arranged on the side of the light source 450 to guide light that is emitted from the light source 450 upward, and optical plates 410a, 410b, 420a, and 420b positioned between the light source 450 and the display panel 300. Further, a reflective sheet 440 may be arranged on a lower surface of the light guide plate 430. The light source 450 may be arranged on at least one side of the light guide plate 430. In an exemplary embodiment, the light source 450 may include a light emitting diode ("LED"), a cold cathode fluorescent lamp ("CCFL"), a hot cathode fluorescent lamp ("HCFL"), or an external electrode fluorescent lamp ("EEFL"), for example. The light guide panel 430 may move light that is emitted from the light source 450 through internal total reflection, and reflect the light through a scattering pattern disposed on the lower surface of the light guide plate 430 to emit the light upward. Further, the reflective sheet 440 may be arranged below the light guide plate 430, and reflect the light, which is emitted downward from the light guide plate 430, to an upper side. The optical plates 410a, 410b, 420a, and 420b may be arranged on the upper portion of the light guide plate 430. The optical plates 410a, 410b, 420a, and 420b may include diffusion sheets 410a and 410b and prism sheets 420a and 420b. The diffusion sheets 410a and 410b may diffuse a part of the light that is emitted from the light source 450 to transfer the diffused light to the display panel 300 that is arranged on upper portions of the diffusion sheets 410a and 410b, and may reflect another part of the light to lower portions of the diffusion sheets 410a and 410b. In an exemplary embodiment, the diffusion sheets 410a and 410b may include at least one of polymethyl methacrylate ("PMMA"), polystyrene ("PS"), polycarbonate ("PC"), cyclo-olefin copolymers ("COC"), polyethylene terephthalate ("PET"), polybutylene terephthalate ("PBT"), and plastic alloy, but are not limited thereto. In an exemplary embodiment, a micro lens array film and a lenticular lens film may be additionally used in the optical plates 410a, 410b, 420a, and 420b, when needed, and the arrangement relationship between them may be changed.

Next, referring to FIG. 12, the display device according to an exemplary embodiment of the invention may include the direct type backlight unit 400b. The display device according to an exemplary embodiment of the invention may include at least one light source 450 and optical plates 410a, 410b, 420a, and 420b arranged between the light source 450 and the display panel 300. In the display device according to an exemplary embodiment of the invention, light that is emitted from the lower light source 450 is uniformly dispersed by upper diffusion sheets 410a and 410b and is collected by prism sheets 420a and 420b to travel to the display panel 300.

Although not separately illustrated, the backlight unit 400a illustrated in FIG. 11 and the backlight unit 400b illustrated in FIG. 12 may be accommodated by a bottom chassis, and the display panel 300 may be seated on a middle frame and may be fixed by a top chassis.

FIGS. 13 to 15 are cross-sectional views explaining a method for manufacturing an optical film illustrated in FIG. 1 by stages.

Referring to FIG. 13, a preliminary pattern layer 100a having a light permeable material may be first prepared. In an exemplary embodiment, the preliminary pattern layer 100a may include photocurable resin or thermosetting resin, but is not limited thereto. In an exemplary embodiment, the preliminary pattern layer 100a may also include a metal material. A stamp 500 that contacts one surface of the preliminary pattern layer 100a may be prepared. The stamp 500 may have a shape that corresponds to first and second intaglio pattern portions 120 and 130 (refer to FIG. 14), and may include a transparent material, for example. In an exemplary embodiment, the stamp 500 may include a material that is not sensitive to heat and/or pressure, for example.

Next, referring to FIGS. 13 and 14, the first and second intaglio pattern portions 120 and 130 may be disposed on the one surface of the preliminary pattern layer 100a through the stamp 500. More specifically, one surface of the stamp 500, i.e., a surface having a shape that corresponds to the shape of the first and second intaglio pattern portions 120 and 130, may be arranged to face the preliminary pattern layer 100a. Thereafter, the one surface of the stamp 500 may be moved to contact the one surface of the preliminary pattern layer 100a. Accordingly, the shape of the one surface of the preliminary pattern layer 100a may be changed to the shape of the first and second intaglio pattern portions 120 and 130. In this case, when the preliminary pattern layer 100a includes resin, the resin may be cured by irradiating the preliminary pattern layer 100a with light or transferring heat thereto through the stamp 500. Accordingly, the display device according to an exemplary embodiment of the invention may be manufactured through the above-described process, i.e., an imprinting process. Accordingly, the processing cost can be reduced, and the manufacturing method can be easily applied to a large-area substrate. Further, since the same pattern can be disposed on a plurality of substrates or pattern layers through one stamp 500, mass production can be achieved.

When the preliminary pattern layer 100a includes a metal material, the preliminary pattern layer 100a may be easily modified through providing heat thereto through the stamp 200 during pressing. When the shape of the preliminary pattern layer 100a is changed to the shape of the first and second intaglio pattern portions 120 and 130, the first and second intaglio pattern portions 120 and 130 can be provided through cooling the preliminary pattern layer 100a. According to the display device according to an exemplary embodiment of the invention, the optical film 100 can be manufactured through the above-described process, i.e., a hot pressing process. Accordingly, the processing cost can be reduced, and the manufacturing method may be easily applied to a large-area substrate.

Next, referring to FIG. 15, a bonding member 200 may be disposed on the inside of the first intaglio pattern portion 120. In this case, the bonding member 200 may be provided through a gravure coating process using a gravure coating device 600. Specifically, the gravure coating device 600 may include a bath 610, a roller 620, and a solution 630 for forming the bonding member. The gravure coating device 600 may move the solution 630 for forming the bonding member to an upper portion of the bath 610 using a groove defined in the surface of the roller 620 and position the solution 630 on the inside of the first intaglio pattern portion 120. Although not illustrated in the drawing, the solution 630 for forming the bonding member pattern may be cured through light irradiation or heat transfer after the solution 630 is coated on the inside of the first intaglio pattern portion 120, and thus the bonding member 200 may be provided. As described above, according to the display device according to an exemplary embodiment of the invention, the bonding member 200 may be selectively disposed on the inside of the first intaglio pattern portion 120 only using the gravure coating process.

Although preferred embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A display device comprising:
   a display panel;
   an optical film arranged on an upper portion of the display panel and including first and second intaglio pattern portions having different depths from each other;
   a bonding member configured to contact at least a part of the display panel and a surface of the first intaglio pattern portion; and
   an air layer configured to fill between a surface of the second intaglio pattern portion and the display panel.

2. The display device of claim 1, wherein a depth of the second intaglio pattern portion is greater than a depth of the first intaglio pattern portion.

3. The display device of claim 1, wherein a depth of the first intaglio pattern portion is equal to or greater than about 2 micrometers.

4. The display device of claim 1, wherein an aspect ratio of the second intaglio pattern portion is about 0.5 to about 1.6.

5. The display device of claim 1, wherein at least one of a width and a depth of the second intaglio pattern portion is equal to or greater than about 10 micrometers.

6. The display device of claim 1, wherein a refractive index of the optical film is about 1.45 to about 1.65.

7. The display device of claim 1, wherein a difference between a refractive index of the optical film and a refractive index of the air layer is equal to or greater than about 0.45.

8. The display device of claim 1, wherein the bonding member comprises at least one of a sticking material and an adhesive material.

9. The display device of claim 1, wherein the bonding member comprises at least one of acrylic based adhesives, silicon based adhesives, urethane based adhesives, polyvinyl butyral adhesives, ethylene-vinyl acetate based adhesives, polyvinyl ether, and melamine resin.

10. The display device of claim 1, wherein the display panel comprises a first polarizing plate, a liquid crystal layer arranged on an upper portion of the first polarizing plate, and a second polarizing plate arranged on an upper portion of the liquid crystal layer, and
   the optical film is arranged on an upper portion of the second polarizing plate.

11. The display device of claim 1, wherein the first intaglio pattern portion includes one surface which directly contacts the display panel.

12. The display device of claim 11, wherein the one surface that directly contacts the display panel has at least one of a sticking and adhesive property.

* * * * *